S. P. WOLFORD.
SEAT BACK FOR FARM MACHINERY.
APPLICATION FILED AUG. 8, 1919.

1,358,273.

Patented Nov. 9, 1920.

Inventor
Stanley P. Wolford

By [signature]

Attorney

UNITED STATES PATENT OFFICE.

STANLEY P. WOLFORD, OF LONDON MILLS, ILLINOIS.

SEAT-BACK FOR FARM MACHINERY.

1,358,273.  Specification of Letters Patent.  Patented Nov. 9, 1920.

Application filed August 8, 1919. Serial No. 316,101.

*To all whom it may concern:*

Be it known that I, STANLEY P. WOLFORD, a citizen of the United States, residing at London Mills, in the county of Fulton, State of Illinois, have invented certain new and useful Improvements in Seat-Backs for Farm Machinery; and I do hereby declare the following to be a full, clear, and exact description of the invention, such as will enable others skilled in the art to which it appertains to make and use the same.

This invention relates to new and useful improvements in back rests and particularly to back rests for the seats of farm machinery.

One object of the present invention is to provide a novel and improved device of this character which will afford the driver of the machine comfort while driving the machine, especially when such driving is performed for a great length of time.

Another object is to provide a novel and improved device of this character which is simple in construction, and which can be easily and quickly attached to the seat of any of the form machines now in use, such as harrows, planters, mowers, binders, or the like.

Other objects and advantages will be apparent from the following description when taken in connection with the accompanying drawing.

Figure 1:
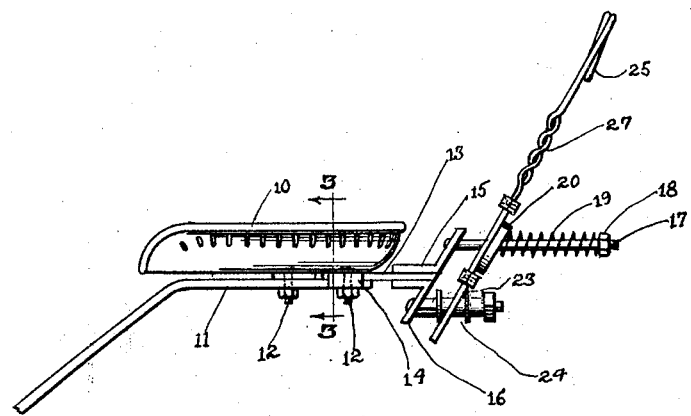
Figure 1 is a side elevation of a seat and portion of the support, showing the back rest applied thereto.
Figure 2:
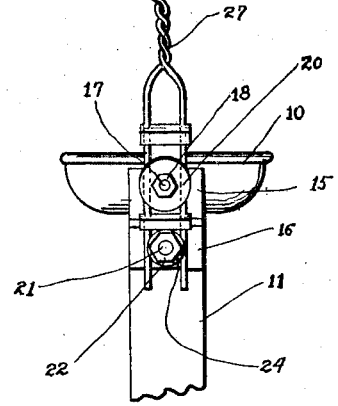
Fig. 2 is a rear elevation of the seat and attachment.
Figure 3:
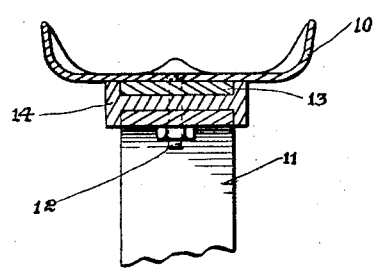
Fig. 3 is a vertical transverse sectional view through the seat and support showing the means for holding the back rest bar against horizontal swinging movement with respect to the seat.

Referring particularly to the accompanying drawing, 10 represents the seat and 11 the support for the seat which is secured thereto by means of the bolts 12.

Disposed between the bottom face of the seat and the support is a rearwardly extending bar or plate 13, the same being secured in such position by means of one of the bolts 12, a plate 14 being interposed between the said plate and support to prevent lateral swinging movement of the bar on the said bolt. Secured to the rear end of the bar or plate 14, and disposed respectively above and below said bar, are the angle members 15 and 16, the rear end of the former being bent upwardly at an obtuse angle, while the rear end of the latter is bent downwardly at an acute angle. Disposed through the angular end of the upper member 15, and extending horizontally rearwardly therefrom, is a bolt 17, on the rear end of which is engaged a nut 18. Encircling the bolt is a coil spring 19, and engaged by the forward end of the spring is a washer plate 20. The rear end of the said spring is arranged to bear against the nut 18, as shown. Disposed through the angular end of the lower member 16 is a similar bolt 21, also having a nut 22 engaged on its rear end. Engaged on this bolt are two sleeves 23, and between the inner adjacent ends of the sleeves, are the washer plates 24, the purpose of which will presently appear.

The back proper is preferably formed from heavy wire of the class used in the making of the metal chairs found in drug stores, and like places, and has the upper wider portion bent to form the circular or helical coils and the smaller intermediate coil, the former being represented by the numeral 25 and the latter by the numeral 26. The leg portions of the wire are twisted together below the said wider portion, as shown at 27, and the remaining portions of the legs extended downwardly in parallel relation to each other and in straddling relation to the two bolts 17 and 19. The lower extremities of the parallel portions of the legs are disposed between the before-mentioned washer plates 24, while the upper portions of the parallel members are disposed against the washer plate 20. The washer plates 24 serve to hold the lower ends of the parallel portions relatively stationary, while the upper ends are permitted to slide along the upper bolt 17, against the tension of the spring, as the driver leans back against the back member.

The back rest can be easily and quickly applied to the seat of any of the farm machines now in use without the necessity of altering or modifying the seat or support thereof. Furthermore, the device provides comfort for the driver while at work.

What is claimed is:

A back rest for vehicle seats including a resilient back member having parallel leg portions at the lower end, a supporting bar adapted for attachment to the seat of the vehicle, rearwardly extending and superimposed members carried by the supporting bar, the said leg portions being disposed in straddling relation to both of said rearwardly extending members, means on the lower member for holding the lower portions of the legs relatively stationary, and a spring carried by the upper member and engaging with the upper portions of the legs whereby said back member is capable of forwardly and rearwardly swinging movement.

In testimony whereof, I affix my signature, in the presence of two witnesses.

STANLEY P. WOLFORD.

Witnesses.
SARAH FOSHAY,
W. A. SAMPSON.